(12) United States Patent
Chen

(10) Patent No.: US 9,671,628 B2
(45) Date of Patent: Jun. 6, 2017

(54) SILICON ELECTRO-OPTICAL MODULATOR

(71) Applicant: ACACIA COMMUNICATIONS INC., Maynard, MA (US)

(72) Inventor: Long Chen, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 232 days.

(21) Appl. No.: 14/298,859

(22) Filed: Jun. 6, 2014

(65) Prior Publication Data

US 2016/0202503 A1  Jul. 14, 2016

Related U.S. Application Data

(60) Provisional application No. 61/832,017, filed on Jun. 6, 2013.

(51) Int. Cl.
  *G02F 1/025* (2006.01)
  *G02B 6/134* (2006.01)
  *G02F 1/015* (2006.01)

(52) U.S. Cl.
  CPC .............. *G02F 1/025* (2013.01); *G02B 6/134* (2013.01); *G02F 2001/0156* (2013.01)

(58) Field of Classification Search
  CPC .. G02B 6/134; G02F 1/025; G02F 2001/0156
  See application file for complete search history.

(56) References Cited

U.S. PATENT DOCUMENTS

| | | | | |
|---|---|---|---|---|
| 7,085,443 | B1* | 8/2006 | Gunn, III | G02F 1/025 359/245 |
| 7,672,553 | B2* | 3/2010 | Gill | G02F 1/025 385/2 |
| 7,865,053 | B2* | 1/2011 | Gill | G02F 1/3133 385/1 |
| 8,362,494 | B2* | 1/2013 | Lo | G02F 1/025 257/13 |
| 8,380,016 | B1* | 2/2013 | Hochberg | G02F 1/2257 385/131 |
| 2011/0180795 | A1 | 7/2011 | Lo et al. | |
| 2011/0194803 | A1 | 8/2011 | Shin et al. | |
| 2012/0063714 | A1* | 3/2012 | Park | G02F 1/025 385/8 |
| 2012/0189239 | A1 | 7/2012 | Tu et al. | |
| 2012/0257850 | A1 | 10/2012 | Fujikata et al. | |
| 2015/0212345 | A1 | 7/2015 | Chen et al. | |

OTHER PUBLICATIONS

U.S. Appl. No. 14/103,652, filed Dec. 11, 2013, Chen et al.

\* cited by examiner

*Primary Examiner* — Ryan Lepisto
(74) *Attorney, Agent, or Firm* — Wolf, Greenfield & Sacks, P.C.

(57) ABSTRACT

Disclosed are designs and methods of fabrication of silicon carrier-depletion based electro-optical modulators having doping configurations that produce modulators exhibiting desirable modulation efficiency, optical absorption loss and bandwidth characteristics. The disclosed method of fabrication of a modulator having such doping configurations utilizes counter doping to create narrow regions of relatively high doping levels near a waveguide center.

12 Claims, 3 Drawing Sheets

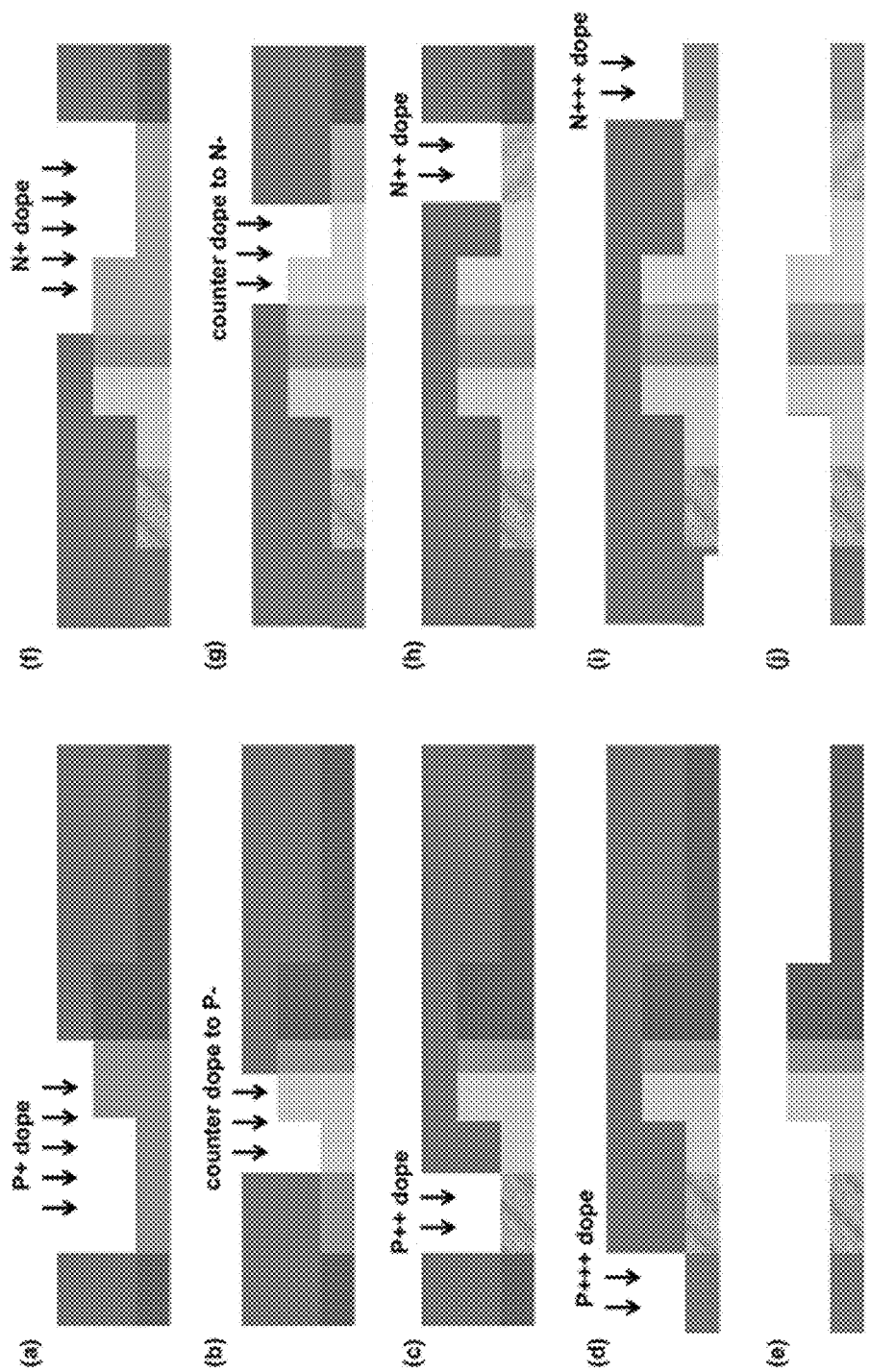

SILICON ELECTRO-OPTICAL MODULATOR

CROSS REFERENCE TO RELATED APPLICATIONS

This application claims the benefit of U.S. Provisional Patent Application Ser. No. 61/832,017 filed Jun. 6, 2013 which is incorporated by reference in its entirety as if set forth at length herein.

TECHNICAL FIELD

This disclosure relates generally to photonic integrated circuits. More particularly, this disclosure pertains to the design and fabrication of a silicon carrier-depletion based electro-optical modulator having a doping configuration resulting in a modulator exhibiting desirable modulation efficiency, optical absorption loss and bandwidth.

BACKGROUND

Contemporary optical communications oftentimes make extensive use of electro-absorption modulators. Accordingly, designs and methods that facilitate the fabrication and enhance the operational characteristics of such modulators would represent a welcome addition to the art.

SUMMARY

An advance in the art is made according to an aspect of the present disclosure directed to design(s) and method(s) for the fabrication of silicon carrier-depletion based electro-optical modulators.

More specifically—and in sharp contrast to contemporary, prior art modulator designs and structures which exhibit a substantially uniform doping configuration across a structure, structures and modulators constructed from same according to the present disclosure exhibit a doping configuration where one or both sides of a diode structure include a number of segments, areas, or regions (i.e., four), each exhibiting significantly different doping levels than those exhibited in neighboring segments.

Silicon carrier-depletion based electro-optical modulators according to the present disclosure advantageously exhibit desirable modulation efficiency, optical absorption loss and bandwidth as compared with contemporary, prior art modulators.

BRIEF DESCRIPTION OF THE DRAWING

A more complete understanding of the present disclosure may be realized by reference to the accompanying drawing in which:

FIGS. 3(a)-3(j) show a series of schematic illustrations depicting the fabrication of an exemplary modulator according to an aspect of the present disclosure.

DETAILED DESCRIPTION

Figure 1:
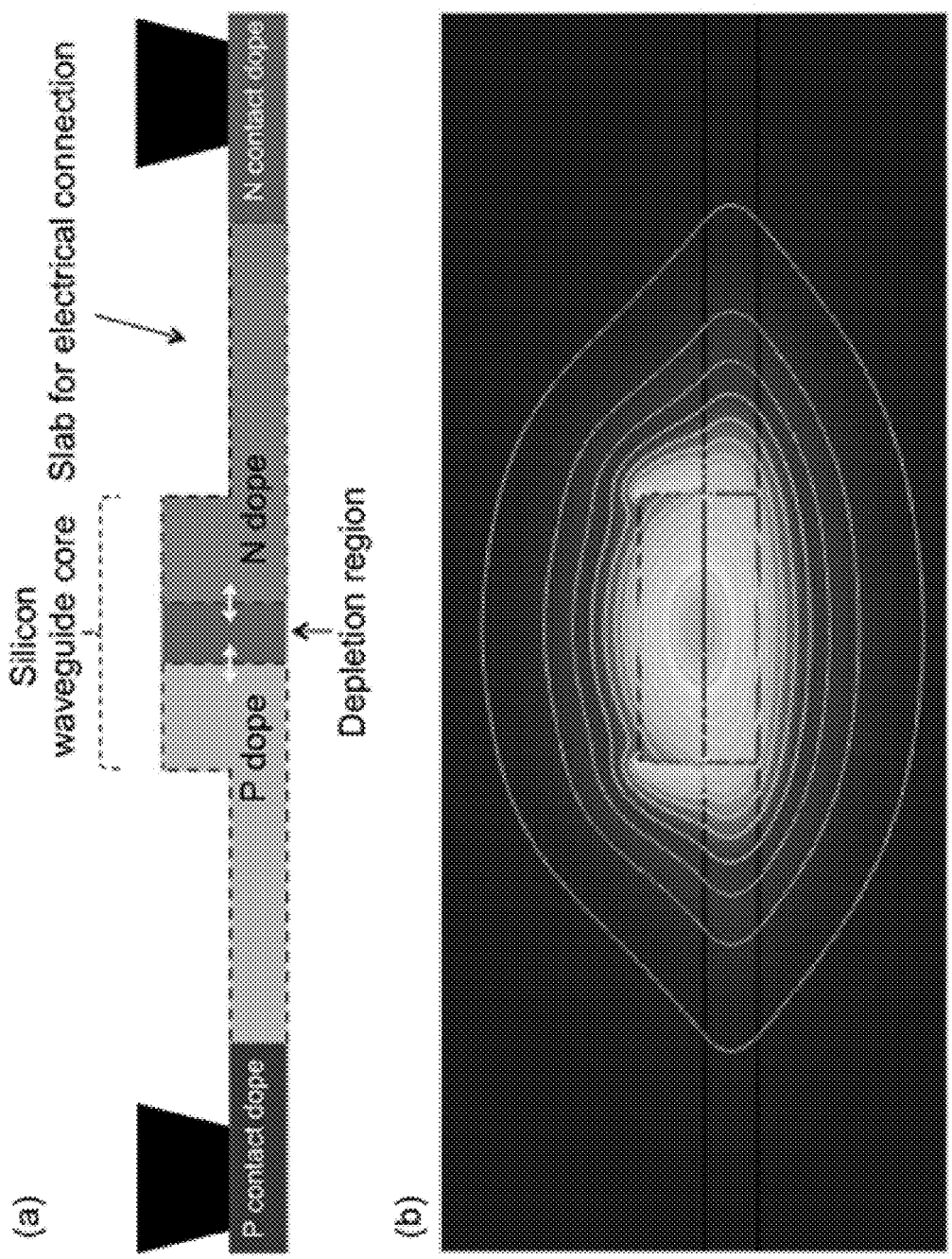
FIGS. 1(a) and 1(b) shows: (a) a schematic illustration of an exemplary modulator; and (b) an optical mode field of the exemplary modulator of 1(a)

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we begin by noting that carrier-depletion based silicon modulators oftentimes have a p-n or p-i-n diode structure positioned within a silicon waveguide core. Upon the application of an electrical voltage applied across the diode, a depletion region within the diode either expands or contracts, and a resulting change in carrier distribution modulates an optical wave propagating along the waveguide.

FIG. 1(a) shows in schematic for a generalized, exemplary modulator design using a lateral p-n junction and the corresponding optical mode field in the waveguide. As depicted in that FIG. 1(a), a silicon waveguide core includes a P-doped region and an N-doped region including a general depletion region between the two. A P-contact is made with a P-contact doped region connected via waveguide to the P-doped region and similarly an N-contact is made with an N-contact doped region connected via waveguide to the N-doped region. The slab area connecting the waveguide core and the P-contact window is substantially homogenously doped to P-type, while the slab area connecting the waveguide core to the N-contact window is substantially homogenously doped to N-type. FIG. 1(b) shows an optical mode field diagram for the exemplary modulator of FIG. 1(a).

As may be readily appreciated by those skilled in the art, there are at least three important performance characteristics of a silicon modulator namely, electro-optical modulation efficiency, insertion loss due to doping absorption, and bandwidth. As may be further appreciated, these characteristics are dependent on the modulator design, particularly the doping configuration of the diode. Therefore, doping configurations—and optimization of same—have significant impact on modulator performance.

With this additional background in place, we may now describe an exemplary modulator design according to one aspect of the present disclosure, namely a modulator exhibiting a doping configuration where one or both sides of a diode structure include a number of segments, areas, or regions (i.e., four), each exhibiting significantly different doping levels than those exhibited in neighboring segment.

Figure 2:
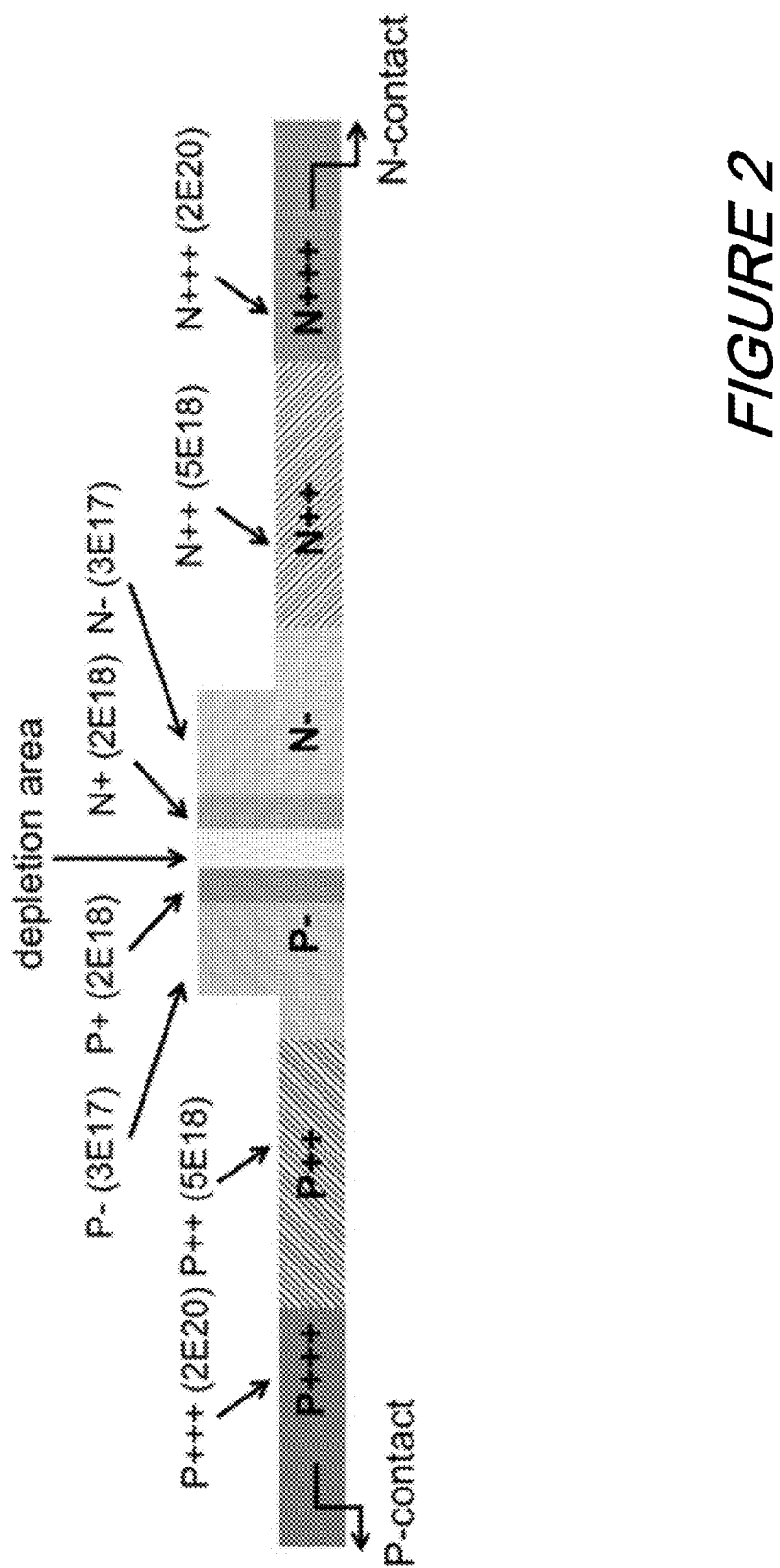
FIG. 2 shows a schematic illustration of an exemplary modulator with doping configuration(s) according to an aspect of the present disclosure.

FIG. 2 shows a schematic illustration of an exemplary modulator with doping configuration(s) according to an aspect of the present disclosure Unlike conventional silicon depletion modulators such as that shown in FIG. 1(a) where nearly uniform doping is maintained on each side of the diode from the edge of depletion area to the contact dope area, in a doping configuration according to the present disclosure a number of doping segments (areas, regions) exist on each side of the diode each exhibiting a significantly different doping concentration.

With continued reference now to that FIG. 2, it may be observed that in the exemplary structure shown a number of doping segments which comprise each side of the diode. In this example, it is noted that there are four (4) segments shown, however those skilled in the art will readily appreciate that a greater or lesser number of segments may be fabricated on each side and that the number of segments on each side do not have to be the same.

For example, as shown in FIG. 2, on the P side of the diode (PN junction), starting from the edge of a depletion area, there are four doping segments. The first segment as shown is, a very narrow P+ segment with a relatively high doping level (2E18 cm$^{-3}$ for example). The second segment shown is a lightly doped P− segment (3E17 cm$^{-3}$ for example) that extends until the edge of a waveguide ridge, and possibly into part of a slab area as well. The third segment shown is a highly doped P++ segment (5E18 cm$^{-3}$ for example) in the slab area, and may extend until the edge of an optical mode field. The fourth segment is a degenerately doped P+++ segment with extremely high doping (2E20 cm$^{-3}$ for example) for low sheet and contact resistances.

At this point we again note that the particular doping configurations/concentrations depicted in this FIG. 2 are only illustrative. The particular doping levels may vary from those shown.

As may now be understood, the N side of the diode may exhibit a similar configuration. Alternatively, such a configuration may be fabricated only on one side of the diode, while the other side uses a configuration different than that shown. Additionally, any depletion area may be formed from a p-n junction, where there is no gap between a p-doped side and an n-doped side, or from a p-i-n junction, where there may exist a small gap between the p-doped side and the n-doped side.

Those skilled in the art should also know that while we have used the term "doping configuration" in this disclosure, that term as used herein generally refers to a configuration of "net activated dopants" of the fabricated modulator. Consequently, different implantation conditions may be utilized to obtain a desired configuration according to the present disclosure.

Additionally, and as noted previously, while we have shown exemplary configuration(s) having four segments and doping configurations for the purpose(s) of the example(s), in practice the configurations may exhibit a non-homogeneous distribution within each segment and gradient near the boundaries between the segments.

Accordingly, those skilled in the art will readily appreciate that the present disclosure considers modulator configuration(s) having a plurality of segments (e.g., four segments) where either the peak or average doping level in each adjacent segment is significantly different (more than 20%) than that of the neighboring segments. In preferred embodiments, the relative doping levels of the segments may exhibit a "high dope, low dope, high dope, very high dope" configuration and may further exhibit these relative doping levels as one expands outward from the waveguide toward the contact(s) region or segments.

Advantageously, modulators constructed according to the present disclosure exhibit improved modulation efficiency, insertion loss, and bandwidth.

As may be appreciated and according to the disclosure, modulation efficiency, characterized as the phase modulation for a given electrical signal in small signal regime, scales roughly with the square root of the doping level near the diode junction. Therefore, relatively high doping levels (P+ and N+) in the narrow region near the depletion area enhance the modulation efficiency.

Additionally, doping absorption loss depends on the overlap of the optical mode field with all doped regions. As depicted in FIG. 1(a), the optical mode extends over the entire waveguide ridge and partially into the slab area. However, except near the central depletion area, most of these regions do not contribute to electro-optical modulation, therefore, relatively low doping levels (P− and N−) in these regions are desirable to reduce the doping absorption loss.

Finally, bandwidth generally depends inversely on the series resistance from the electrical contact to the depletion area. As may be appreciated—and general speaking—degenerate doping (P+++ and N+++, typically 2E19 or higher) is used near the contact area to reduce the contact resistance. However, due to the extremely high optical absorption loss associated with such doping levels, the contact doped areas have to be fairly far (for example, above 700 nm) away physically from the edge of the waveguide. The highly doped P++ and N++ segments in the slab can bridge the contact doped areas (P+++ and N+++) and the lightly doped areas (P− and N−) near the waveguide. Since these segments have much higher conductivity than the lightly doped segments, acceptable absorption coefficient, and only have small overlap with the optical mode field, they advantageously and considerably reduce the series resistance without incurring significant optical absorption loss.

Turning now to FIGS. 3(a)-3(j), there it is shown in schematic form a series of illustrations depicting the fabrication of an exemplary structure according to an aspect of the present disclosure. We note further that we use interchangeably the terms areas, regions, and segments as they pertain to the fabricated structures previously and now described.

As may now be appreciated, a doping configuration according to the present disclosure has very narrow regions of relatively high doping levels (P+ and N+) fabricated near the center of a waveguide. Their (the regions) widths are preferably 150 nm or less for optimal performances. Such resolution is challenging for current fabrication capabilities if they are to be created directly from implantation. Accordingly, we now disclose a method that does not require a high-resolution mask for implantation.

As shown in that series of illustrations of FIGS. 3(a)-3(j), to create the narrow regions of relatively high doping levels (P+ and N+) next to lightly doped regions (P− and N−), one can first dope both regions to the high levels, and then mask one region and counter dope the other region to lightly doped region.

One may readily appreciate that there can be many variations from this exemplary process flow wherein counter doping is preferably used to create narrow regions of relatively high doping levels.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A silicon electro-optical modulator structure comprising:
   a waveguide central core region including a depletion region;
   adjacent to one side of the central core region is formed:
     a P+ region formed adjacent to the depletion region;
     a P− region formed adjacent to the P+ region;
     a P++ region formed adjacent to the P− region; and
     a P+++ region formed adjacent to the P++ region,
   adjacent to the other side of the central core region is formed:
     a N+ region formed adjacent to the depletion region;
     a N− region formed adjacent to the N+ region;
     a N++ region formed adjacent to the N− region; and
     a N+++ region formed adjacent to the N++ region.

2. The silicon electro-optical modulator structure of claim 1, wherein said P+ and N+ regions exhibit doping levels of substantially 2E18 cm$^{-3}$ or greater, said P− and N− regions exhibit doping levels of substantially 3E17 cm$^{-3}$, said P++ and N++ regions exhibit doping levels of substantially 5E18 cm$^{-3}$, and said P+++ and said N+++ regions exhibit doping levels of substantially 2E20 cm$^{-3}$.

3. An electro-optical modulator, comprising:
   a semiconductor material waveguide having first, second, and third doped regions of a same dopant type,
   wherein the first doped region is closest to a center of the waveguide compared to the second and third doped regions, and the second doped region is laterally between the first and third doped regions,
   wherein the third doped region has a greater doping concentration than the first doped region and the first doped region has a greater doping concentration than the second doped region.

4. The electro-optical modulator of claim 3, wherein the semiconductor material waveguide further has a fourth doped region of the same dopant type, the fourth doped region being laterally adjacent to the third doped region such that the third doped region is between the second and fourth doped regions, wherein the fourth doped region has a greater doping concentration than the third doped region.

5. The electro-optical modulator of claim 4, wherein the third doped region is outside an optical mode field in the semiconductor material waveguide.

6. The electro-optical modulator of claim 4, wherein the second doped region extends from a core of the semiconductor material waveguide to a slab of the semiconductor material waveguide.

7. The electro-optical modulator of claim 3, wherein the second doped region extends from a core of the semiconductor material waveguide to a slab of the semiconductor material waveguide.

8. The electro-optical modulator of claim 3, wherein the first and second doped regions are at least partially within a ridge of the semiconductor material waveguide.

9. The electro-optical modulator of claim 3, wherein the first doped region has a width of 150 nm or less.

10. The electro-optical modulator of claim 3, wherein a doping concentration of the second doped region is a concentration of net activated dopants.

11. The electro-optical modulator of claim 3, wherein the same dopant type of the first, second, and third doped regions is n-type.

12. The electro-optical modulator of claim 3, wherein the same dopant type of the first, second, and third doped regions is p-type.

* * * * *